United States Patent
Nallipogu et al.

(10) Patent No.: US 7,873,957 B2
(45) Date of Patent: Jan. 18, 2011

(54) MINIMIZING USER DISRUPTION DURING MODIFICATION OPERATIONS

(75) Inventors: Elsie Nallipogu, Seattle, WA (US); Frederic O. Vicik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 11/494,320

(22) Filed: Jul. 27, 2006

(65) Prior Publication Data

US 2008/0028391 A1 Jan. 31, 2008

(51) Int. Cl.
G06F 9/44 (2006.01)

(52) U.S. Cl. .................. 717/168; 717/169
(58) Field of Classification Search .......... 717/168–169
See application file for complete search history.

(56) References Cited

U.S. PATENT DOCUMENTS

| | | | | |
|---|---|---|---|---|
| 5,359,730 A * | 10/1994 | Marron | | |
| 5,905,492 A * | 5/1999 | Straub et al. | ................. | 715/744 |
| 5,974,454 A * | 10/1999 | Apfel et al. | ................. | 709/221 |
| 6,009,274 A * | 12/1999 | Fletcher et al. | | |
| 6,199,204 B1 * | 3/2001 | Donohue | .................... | 717/178 |
| 6,237,091 B1 * | 5/2001 | Firooz et al. | | |
| 6,418,555 B2 * | 7/2002 | Mohammed | ................ | 717/169 |
| 6,434,744 B1 * | 8/2002 | Chamberlain et al. | | |
| 6,681,389 B1 * | 1/2004 | Engel et al. | | |
| 6,976,062 B1 * | 12/2005 | Denby et al. | ................ | 709/220 |
| 6,976,251 B2 * | 12/2005 | Meyerson | ................... | 717/173 |
| 7,171,660 B2 * | 1/2007 | McCaleb et al. | ............ | 717/171 |
| 7,539,686 B2 * | 5/2009 | Shepard et al. | .................... | 1/1 |
| 7,546,595 B1 * | 6/2009 | Wickham et al. | ........... | 717/168 |
| 7,555,749 B2 * | 6/2009 | Wickham et al. | ........... | 717/168 |
| 7,584,467 B2 * | 9/2009 | Wickham et al. | ........... | 717/171 |
| 2002/0073410 A1 * | 6/2002 | Lundback et al. | ........... | 717/171 |
| 2003/0074487 A1 * | 4/2003 | Akgul et al. | | |
| 2004/0023646 A1 * | 2/2004 | Inami et al. | ................. | 455/418 |
| 2004/0093359 A1 * | 5/2004 | Sharpe et al. | ............... | 707/201 |
| 2004/0181787 A1 * | 9/2004 | Wickham et al. | ........... | 717/168 |
| 2004/0187103 A1 * | 9/2004 | Wickham et al. | ........... | 717/168 |
| 2005/0091398 A1 * | 4/2005 | Roberts et al. | .............. | 709/232 |
| 2005/0149922 A1 * | 7/2005 | Vincent | | |
| 2005/0257205 A1 * | 11/2005 | Costea et al. | | |
| 2005/0257215 A1 * | 11/2005 | Denby et al. | ................ | 717/172 |
| 2006/0053116 A1 * | 3/2006 | Rits et al. | | |
| 2006/0059481 A1 * | 3/2006 | Smith et al. | | |
| 2006/0075001 A1 * | 4/2006 | Canning et al. | ............. | 707/203 |
| 2006/0095903 A1 * | 5/2006 | Cheam et al. | | |
| 2006/0130040 A1 * | 6/2006 | Subramanian et al. | ...... | 717/168 |

(Continued)

OTHER PUBLICATIONS

"Microsoft unviels Freeze Dry for Window" Angus Kidman, ZDNet Australia, Sep. 1, 2005. ZDNet.pdf.*

(Continued)

*Primary Examiner*—Anna Deng
(74) *Attorney, Agent, or Firm*—Marshall, Gerstein & Borun LLP

(57) ABSTRACT

A reboot reduction infrastructure may be used by applications to make installing modifications as unobtrusive as possible. Applications may register with the reboot reduction infrastructure and use provided APIs to detect which applications and services have files in use, shutdown down those applications with files in use and then restart those applications in a form similar to which they were in when the applications were shut down.

17 Claims, 5 Drawing Sheets

U.S. PATENT DOCUMENTS

2006/0212865 A1*  9/2006  Vincent et al. .............. 717/168
2009/0113416 A1*  4/2009  Bealkowski et al. ........ 717/177

OTHER PUBLICATIONS

"Software Update Services Overview" Microsoft Corporation, Jun. 2002. Microsoft.pdf.*

Orso et al., "A Technique for Dynamic Updating of Java Software," http://www.cs.utexas.edu/~arao/pubs/icsm02_dusc.pdf.*

Hicks et al., "Dynamic Software Updating", ACM, 2005, http://delivery.acm.org/10.1145/1110000/1108971/p1049-hicks.pdf?key1=1108971&key2=9554170511&coll=GUIDE&dl=GUIDE&CFID=73981819&CFTOKEN=91419583.*

Stoyle et al. "Mutatis Mutandis: Safe and Predictable Dynamic Software Updating", ACM 2005, http://www.sics.se/pepito/D3.12/papers/update-popl-2005.pdf.*

* cited by examiner

MINIMIZING USER DISRUPTION DURING MODIFICATION OPERATIONS

Software modification reboots have been a huge source of customer pain and complaints for many years. In fact, it's an area that has not seen any significant improvement in years. The customer pain and frustration has increased as software companies release more security updates to protect their systems from attack. These types of maintenance operations cost enterprises a lot of money because of downtime on mission critical servers and loss in productivity for knowledge workers. These maintenance operations also cause unwanted disruption to many home users when they cannot use their system until it restarts because they installed software applications or a software modification.

SUMMARY

A reboot reduction infrastructure may be used by other applications to make installing modifications as unobtrusive as possible. Applications may register with the reboot reduction infrastructure and use provided APIs to detect which applications and services have files in use, shutdown down those applications with files in use and then restart those applications in a form similar to which they were in when the applications were shut down.

DRAWINGS

Figure 1:
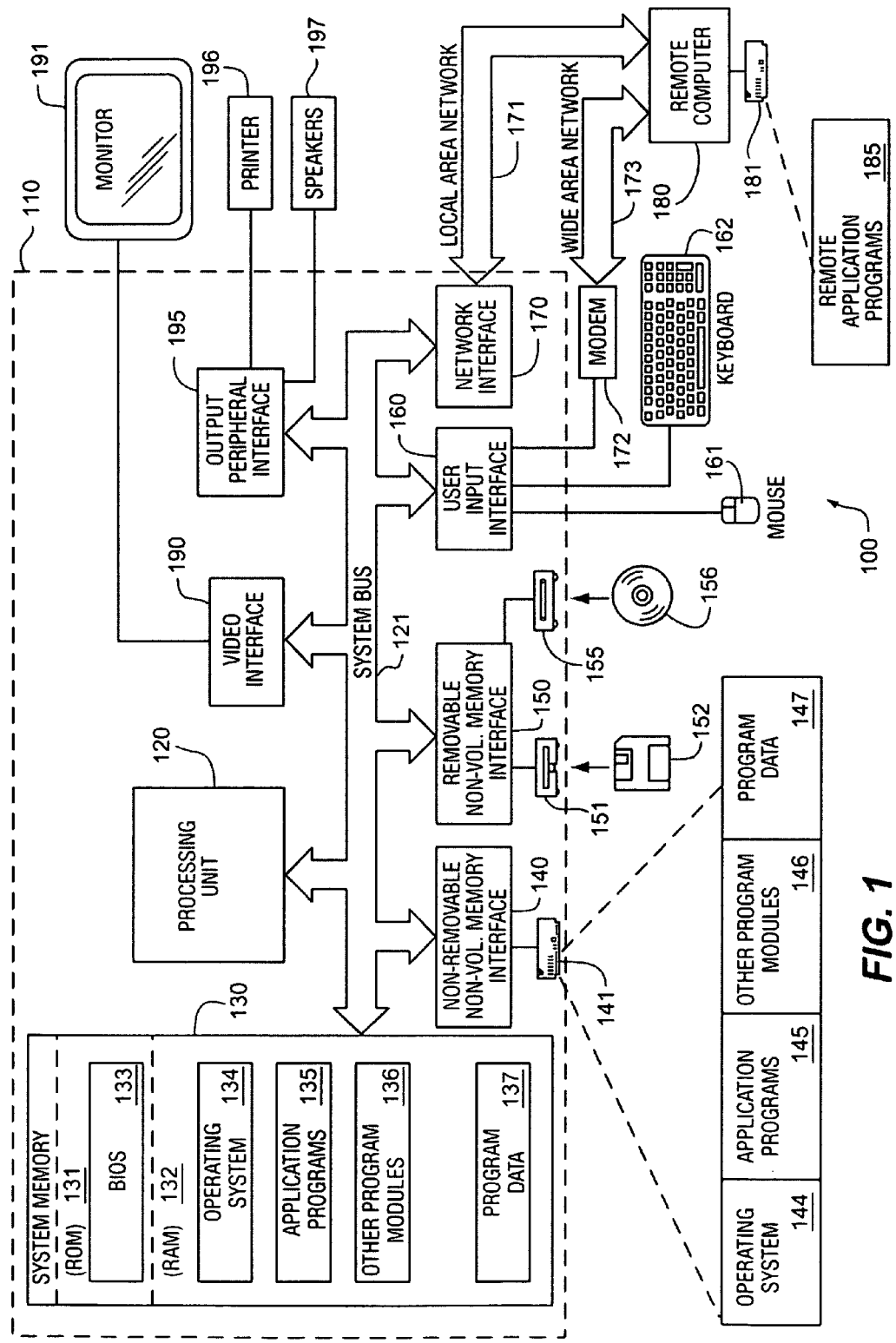
Figure 2:
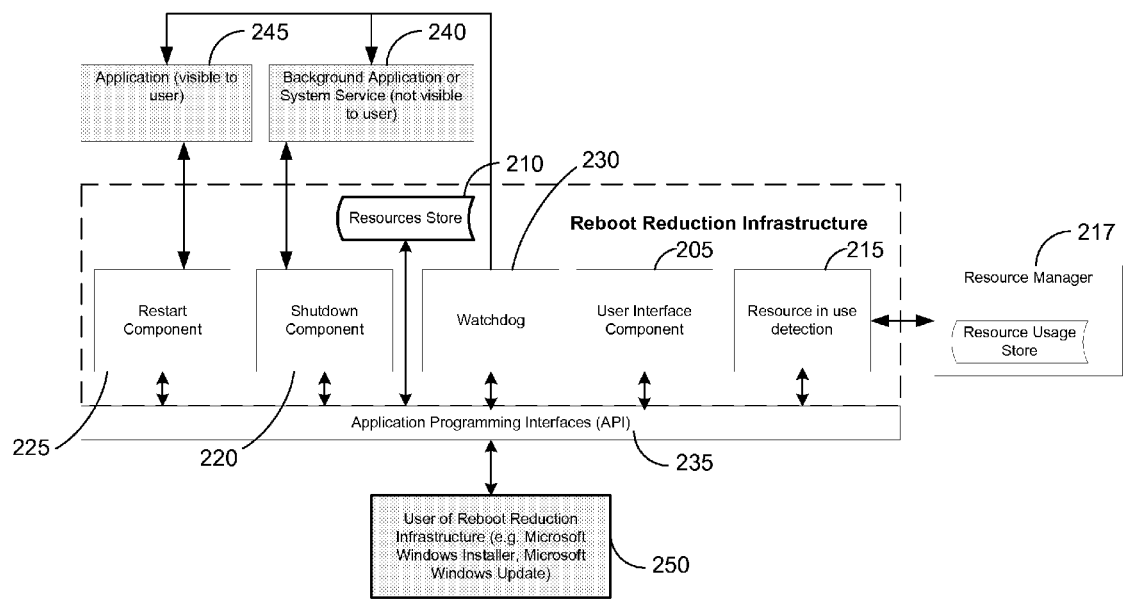
Figure 3:
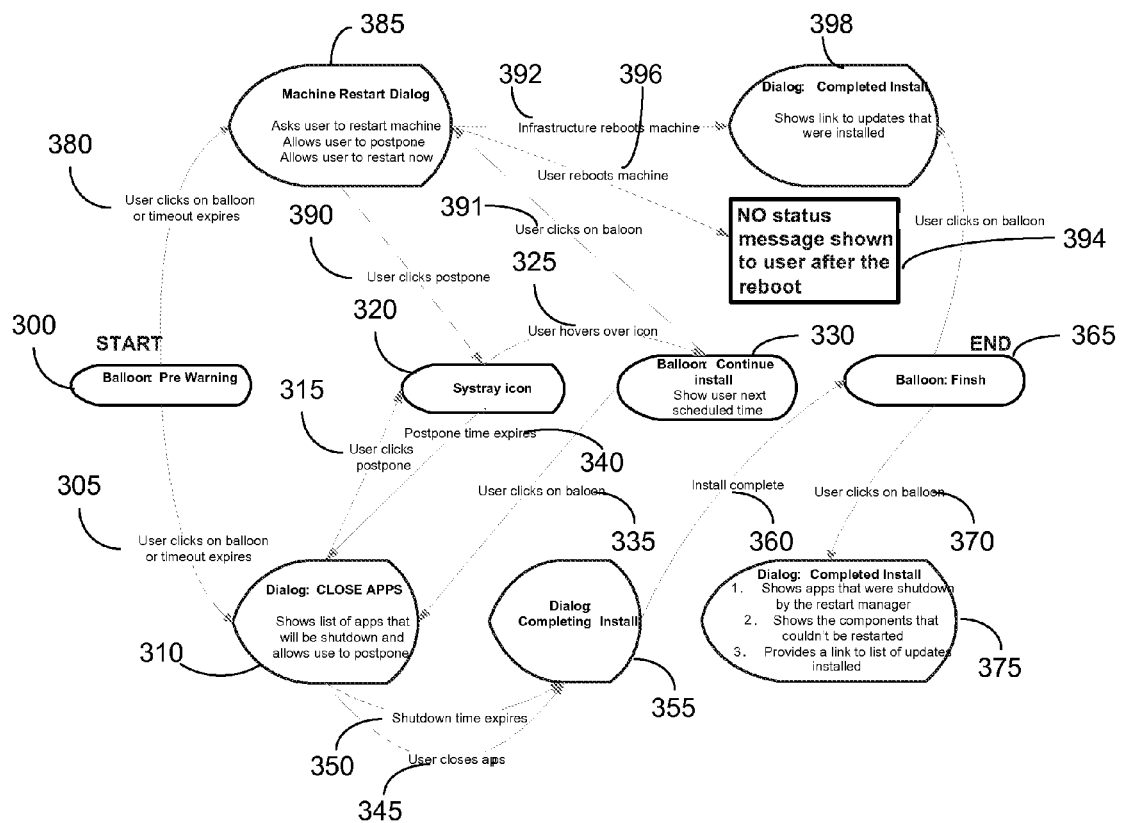
Figure 4:
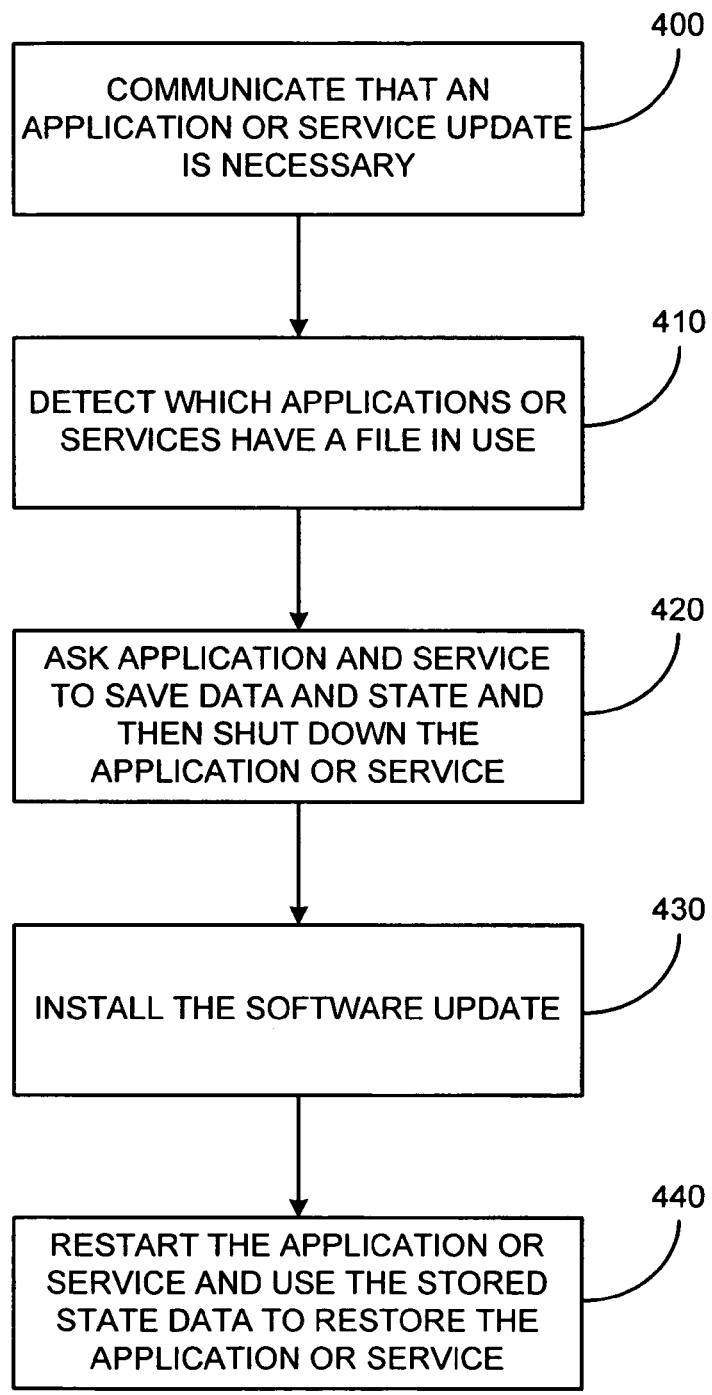
Figure 5:
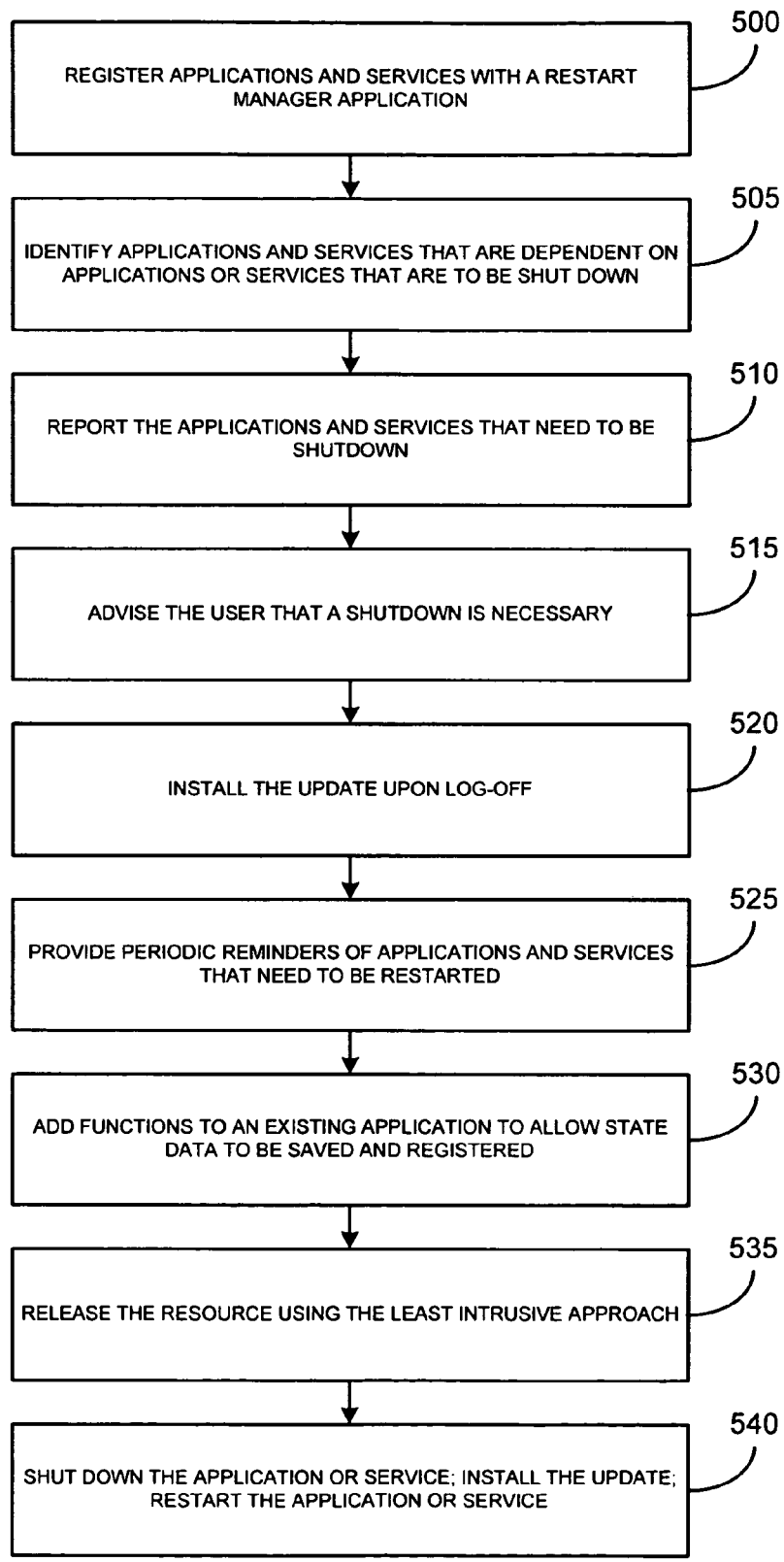

FIG. 1 is an illustration of a computing system which may be used to implement the method;

FIG. 2 may be a high level illustration of a reboot reduction infrastructure;

FIG. 3 may illustrate the user interface flow for scheduled installs;

FIG. 4 may be an illustration of a method of minimizing disruptions by modifications to software applications or service using the reboot reduction infrastructure; and FIG. 5 may include additional steps that may be part of the method.

DETAILED DESCRIPTION OF THE INVENTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. .sctn. 112, sixth paragraph.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 2 may be a high level illustration of a reboot reduction infrastructure 200. In previous operating systems, software modifications were applied by requesting a reboot to replace a resource such as a file that were in use by applications at worst and at best they stopped applications that were using the resources to be replaced. The latter causes less disruption because it is normally faster to shutdown applications that to shutdown the system. The reboot reduction infrastructure takes this a step further by providing a protocol to request applications to save user data and application state automatically and shutdown silently without user input. The protocol also may provide a way for the application to tell the reboot reduction infrastructure how to restart it in way that will restore (or re-hydrate) the application state and user data by, for example, providing a restart command to the reboot reduction infrastructure. An application's state can be things like location of windows on the desktop, color/format of windows, information in the clip board. User data may be data entered by the user such as data entered into an input box, etc.

In short, APIs may detect which applications and services have files in use, shutdown down those applications and restart those applications using a command that was registered to be used to restart the application. Saved data may be used to re-hydrate the applications to return to a form or state very similar to the state they were in before they were shutdown. If the application or service to be modified is not visible, it may be replaced automatically. If an application is visible, users may be presented options on how the modification should be installed.

Block 205 may be a component that displays a user interface to the user. The flow of the various displays may be illustrated and described in FIG. 3. Block 210 may be a resources store. The resource store 210 may maintain the list of resources (e.g. files, application names, service names or process identifiers) that have registered with the method. This information may be used by the resource in use detection component 215 to determine which applications or services are using the resource. This information is also used by the shutdown component 220 and restart component 225 to shutdown and restart applications or services specified by the user of the infrastructure. This store may also contain information on the command that should be used to restart application and initiate a state re-hydration. The restart command may also be stored in the application metadata (e.g. an XML manifest), in a global store (e.g. the Windows Registry) or in the process address space (e.g. the Process Environment Block (PEB). An API may be provided to store the command line in any of the storage locations mentioned above.

Block 215 may illustrate the resource in use detection component 215. This component may detect which application or service has a resource in use. It may communicate with the manager of the resource 217 (e.g. for Dynamic Linked Libraries (DLL) the resource manager could be the DLL loader). The resource manager component 217 may maintain accounting information on which process (application or service) has the resource in use.

Block 220 may illustrate the shutdown component 220. This component may shutdown the applications and services that have registered resources in use, applications and services that were registered by the user of the infrastructure in the resource store 210. It may also shutdown applications cleanly (with the application's cooperation) or forcefully (without cooperation of the application).

Block 225 may illustrate the restart component 225. This component may restart the applications or services that were closed by the shutdown component 220. It may only restart applications and services that have registered a restart command in any of the stores in the resource store 210.

Block 230 may illustrate a watch dog component 230. This component may continuously monitor the system (e.g. every 5 minutes) and check whether any applications 240 245 or services that have been shutdown. It may also be used to start the user interface component 205 periodically to remind the user to close applications. Each time the reminder is shown, the watchdog may update the list by removing applications that were shutdown since the last reminder or adding new applications that were started since the last reminder using any of the registered resources.

Block 235 may illustrate APIs used by the components. The APIs 235 may be the interfaces callers (e.g. installers) that may be used to invoke the reboot infrastructure capabilities 250. Examples of infrastructure capabilities 250 include Microsoft Windows Installer and Microsoft Windows Update.

Using the method and apparatus described herein, modifications to software can be applied with minimal user input and can be used to cause no user disruption. One way to do this is by applying the software modification at a time when the user is known not to be at the machine, then automatically shutdown and re-hydrate applications. In cases where a system shutdown is required because a critical system component needs to be restarted, then the applications can be re-hydrated after the machine restart. When the user returns to the machine they do not notice any change to their running applications and user data.

Modifications may be scheduled. Scheduled installs occur when users opt in to have modifications automatically installed on their machines through Automatic Update, for example. FIG. 3 may illustrate the user interface flow for scheduled installs. The flow covers scenarios when a user is logged on and also when the user is not logged on.

User initiated installs occur when a user selected or decided to perform an install. Some of the common user initiated scenarios are that a user has "download and notify" option of windows update and selected the option to install now, a user goes to the windows update website to find and install modifications or a user installs software from external media, e.g., CD. At block 300, a balloon notification may be shown to warn that some applications need to close. At block 305, a user may select on the balloon notification or a timeout may expire. At block 310, the reboot reduction infrastructure may display a dialog to ask the user to shutdown the applications. All the applications that need to be shutdown may be highlighted in a taskbar to help the user easily identify the applications. Only applications that are visible to the user may be displayed to the user.

The application close dialog may appear in the taskbar. For example, a user may be working on a report and may receive a message saying that the System Administrator is deploying a critical update and his PC is about to be rebooted in the time shown. The user may select to quickly save all his work and choose to reboot right away.

A user may also select to postpone the shutdown. The user may be provided with the following postpone options:

5 minutes
15 minutes
30 minutes
2 hours

For scheduled modifications that have a deadline of 24 hours, some postpone options are removed if there is not sufficient time before the deadline—e.g. if 23 hours have elapsed from the time the first notification provided to the user the 2 hour option is disabled. If the user selects to postpone closing the applications 315, an icon may be displayed 320 to remind the user that a shutdown is still needed. If the user hovers 325 over the icon 320, a balloon may be displayed 330 that may display a "continue" display to remind the user to continue the installation process or the next scheduled time for the installation process. If the balloon is selected 335, control may pass to block 310 where the close application dialog may be displayed. In addition, if the postpone time selected previously expires 340, control may pass to block 310 where the close application dialog may be displayed.

For example, a user may elect to have updates installed automatically on her machine daily at 11 pm. The user may be working late one night on her PC and she may receive a notification that her updates have finished installing and that Microsoft Word and Microsoft Outlook will be restarted according to the timer presented. She may postpone the install or let the timer run out. In addition, she could choose to postpone the install for one hour and continue working on her machine. An hour later the user may see another message that Microsoft Word and Microsoft Outlook need to be restarted and she may choose to restart them right away.

A user may choose to manually close an application 345. If the user closes any application while the dialog is displayed, the dialog automatically refreshes the list with only the remaining apps as the watchdog component 230 (FIG. 2) may continuously monitor the system and ensure that the list is updates and refreshed. In addition, the time period in which an application must be shutdown may expire 350 which may cause the reboot reduction infrastructure to shutdown the application.

For example, a user may prefer to review updates before they install on his machine and thus sets update preferences set to notify him before installing new updates. The user may see that a new update is ready for him to install. He may review the list of updates, decides to accept them all, and starts the installation process. The user may go about his other tasks. When the updates have finished installing, the user may see a message that some applications need to be restarted to complete the installation. The user closes the applications.

At block 355, a dialog may be displayed that illustrates the progress of the installation. At block 360, the installation may be complete and at block 365, a balloon may be displayed that describes that the installation is complete. If the user chooses to select the balloon 370 from block 365, the method may display a completed installation dialog 375 which may display the applications that were shutdown, the components that could not be restarted and a link to a list of modifications that were installed.

At block 380, the balloon 300 may be selected to start the machine restart dialog 385. The machine restart dialog 385 may also be reached if a timeout for an update has occurred. The dialog may allow a user to postpone the restart 390 and an icon may be displayed 320 to remind the user that a restart is waiting. If a user hovers over the icon, a balloon may appear 330 to remind the user to continue the restart. If the user selects 391 the balloon 330, the machine restart dialog 385 may again be displayed. If the user reboots the machine 392, a status message may or may not be displayed 394 after the reboot. If the reboot reduction infrastructure reboots the machine 396, a dialog balloon may be displayed that states that the install was completed and may link to modifications that were installed 398 and the method may end 365. In addition, a user may also select to postpone the shutdown. The user may be provided with the following postpone options:

5 minutes
15 minutes
30 minutes
2 hours.

Updates that affect multiple applications, each of which may need to be shut down, may be installed at one time. For example, a user may install a cumulative update for Microsoft Internet Explorer and two of them require Microsoft Word, Microsoft Outlook and Real Player to be restarted. However, the user does not notice three separate shutdowns, but only one as all the applications are restarted once and all the updates are installed.

FIG. 4 may be an illustration of a method of minimizing disruptions by modifications to software applications or service using the reboot reduction infrastructure. At block 400, the method may communicate that an application or service modification is necessary.

At block 410, the method may detect which applications or services have a resource in use. As described in later sections, an API may be provided to detect which applications or services have a resource in use.

At block 420, if an application or service has a resource in use the method may ask the application to save state data and user data for the application or service and shut down the application or service. The data may be used to return the application or service to the current state when the application or service is restarted, such as the location of a curser, location of a mouse, text in a text box, etc. This block may occur without asking the user to save the current state data and user data.

For example, a user may be working on a report and may receive a message saying that a new update is available. The user may decide to install those updates now and continue to work on his report. The user may then see a message that word will be shutdown and that s/he should save his work. The user finishes of a section of his report and then saves his document. The user then checks his email while the install completes. When the install is completed, the user re-opens his document and continues his report right where he left off.

At block 430, the method may install the software modification. Software modifications are well known in the art.

At block 440, if the application or service was shut down, the method may restart the application or service using a command that was provided when the application registered with the method. The stored state data may be used to restore the application or service to the state they were in before the restart.

A user can also select to have updates installed automatically on her machine daily such as at 3 am. The user may not turn off her machine nor does she log off her machine when she's not using it. The next time she uses her machine, she may see a message informing her that Microsoft Word and Microsoft Outlook were restarted due to updates. She may notice that Microsoft Word and Microsoft Outlook are still running and that her documents are still open. She may check her mail and then continue working on her report from where she left off.

FIG. 5 may include additional steps that may be part of the method. At block 500, resources, applications and services may be registered with a reboot reduction infrastructure application. As described below, there are numerous APIs that assist applications and services register with the reboot reduction infrastructure.

At block 505, the method may identify applications and services that are dependent on applications or service that are to be shutdown and shutting down the identified applications and services. As described below, there are numerous APIs that assist identify applications and services that are dependant on the processes and services that are to be shutdown.

At block 510, the method may report the applications and services that need to be shutdown before an update begins. The report may be displayed to a user, for example.

At block 515, if the application or service is an application or service visible to a user, the method may advise the user that a shutdown is necessary and allow a user to select to defer the shutdown until a time in the future when the application or service is not active. Applications and services that are not visible to a user may not requiring informing the user that a shutdown is necessary as the application or service can be shutdown without effecting the user experience.

For example, say a user installs an update. This update may require some services to be shutdown that are not visible. The user may not see any difference on his/her machine as some services are being shutdown and restarted.

For example, a user may receive a message notifying him/her that Windows will be interrupted for his update to finish installing. As s/he wants that update to finish install, /she does not use the option to cancel the shutdown. S/he then sees that Windows temporarily goes into a frozen state and is informed about the progress as it gets updated. When the update is done, everything returns to normal.

At block 520, the method may install the modification upon one of log-off, on process termination or on DLL unload. By delaying the shutdown to a later time, the user experience may not be effected. The watchdog component 230 (FIG. 2) may be monitoring the system and determining when an application releases the DLL. At a later time the method may ask an application to shutdown to release the DLL, ask the application to release the file to release the DLL or ask the user to log off to release the file and the DLL.

At block 525, the method may provide periodic reminders of applications and services that need to be restarted such that an update may be installed. The reminders may be displays or sounds or other ways to appeal to a user's senses.

At block 530, the method may allow existing applications to save state and data. It may also allow these applications to register a restart command with a reboot reduction infrastructure application. When the registered restart command is invoked it may initiate a re-hydration of previously saved state and data. The existing application may use the APIs described further in this application to facilitate the use of the reboot reduction infrastructure.

At block 535, when an application or service is asked to release a resource, the application or service may release the resource using the least intrusive approach possible selected from the group including:

releasing the resource with a partial loss in functionality;

shutting down the application or service; and shutting down the computer. The least intrusive approach will try to have the smallest impact on the experience of the user.

At block 540, if the application or service has a resource in use but the application or service is not visible to a user, the method may:

automatically shut down the application or service;

install the modification; and restart the application or service without providing notice to the user. As the application or service is not visible, the user experience may not be effected by shutdown the application.

Shutdown and restart of application may be ordered in way that is least disruptive to the user. For example, applications that the user frequently interacts with may be shutdown last and started first. Similarly, applications that are visible to the user may be shutdown late and restarted early and background applications that perform common user functions may have higher priority (.e.g. the print spooler service that performs printing functionality may have higher priority) and may be shut down later than applications that the user seldom uses.

To effectuate the reboot reduction infrastructure, interfaces and APIs may be used by installers and patch distribution tools to use to the reboot reduction infrastructure. It could also be used by any application that needs resources to be freed during maintenance operations or depletion of the resource. The reboot reduction infrastructure itself will not save data but will provide the guidelines for other applications to save data used to re-hydrate themselves upon restart.

The method may also apply when multiple users use the same computer but use the machine under their two separate accounts. Say Alpha is working on a document and leaves her computer for the day. Beta logs into his account and visits the Windows update website to install updates. He may choose to install some updates and continues his work. Beta then sees a message informing him that some of his applications need to be restarted and is presented with a countdown timer. Beta may also see a message that another users' applications will be restarted in the time shown by the shutdown timer. As this is a critical update, Beta does not use the option to postpone the application restarts. The next day Alpha logs on to her machine and sees a message informing her that some applications were restarted to install an update. All users (or sessions) that were impacted by the update may receive a message that lists what was restarted (or failed to restart). If there was no impact to a session, then no message may be shown to the user.

In another embodiment, the user with the highest administrative priority may decide how the modification is installed. For example, Alpha may have administrative authority and may be able to overrule or veto any modification decisions made by Beta.

When there are multiple users logged on (for example, with fast user switching) there is a single system-wide timer that counts down, and if another user logs in, they may be presented with the remaining time in the countdown. Each user should be given sufficient time to read the dialog, even if there isn't sufficient time remaining in the system-wide countdown.

The description below outlines a sample execution sequence for reboot reduction infrastructure API callers. Installer names are examples and are not necessarily representative of all the calls an installer may make.

Registration

Some methods register information for the reboot reduction infrastructure. These methods may write the registration information to a central store e.g. system registry. Callers can register resources, application names or service names.

A function may provide status information for the progress of the reboot reduction infrastructure function. This may be used by the component controlling the User Interface to show progress information. The component that is controlling the User Interface and sequence of installing different packages may be expected to call these APIs. For example, this could be the Window Update client or the Windows Installer.

1. Files

Filenames may be written to the registry. The API may check if the files have already been registered before writing the value to the registry.

Value written to registry: Fullpath filename

2. Services

When registering services for shutdown/restart, the caller may specify the service short name. The API may check if service has already been registered before writing the value to the registry.

3. Processes

When registering a process for shutdown/restart, a process identifier and process creation time may be provided. This may ensure a unique set even when Process Identifiers are recycled by the Operating System.

API to Determine Which Applications to Close

This function may be used by installers to get the list of all applications that need to be restarted. The reboot reduction infrastructure may compile this list from all the resources, processes and services that have been registered. If the reboot reduction infrastructure determines that it cannot free the registered resources by shutting down the applications, then it may notify the caller that a reboot is required. It may also provide a reboot reason code.

Return values may include a list of processes that need to be restarted for all the resources, processes and services that are registered, whether a reboot is required, etc. For all errors other than those described above, the API may return the most recent error received while running from any other component. For example, these may be standard errors from winerror.h.

The following steps may be followed to determine the list of applications and services that need to be restarted 1. Detect processes holding resources in use For example, in the Windows operating system, the method may detect processes that are holding resources in use using NTQueryObject with the ObjectProcessesUsingFileInformation option. This function may be used to identify the process that has the target resource in use.

2. The method may add all the Process Identifiers and Service names that were registered.

3. Enumerate services The method may enumerate all the services in each of the registered processes.

4. Add dependent services For each service in the method may query a global store to identify dependent services and add them to the list.

5. Classify processes All the processes that have resources in use may be classified into different types. This may be used by the installer to determine what to applications to show to the user (e.g. only applications with visible windows). The classification may also used by the reboot reduction infrastructure to determine the shutdown method for the app.

6. Detect if a machine restart is required The method may determine if a machine restart is required. This may be accomplished by checking whether any applications or services in the list are critical to the operating system. This information can be queried from a global store or known list.

Shutdown Applications Functions

Detection of which services in a process that contains one or more services may return imperfect results in uncommon situations. Therefore, when shutting down services, the reboot reduction infrastructure may need to check whether the resources were successfully released after shutting down just the detected services. If the resources were not successfully released, it may default to shutting down all the services in the process 1. Determine whether a reboot is required to shutdown one or more of the affected apps. Return an error code to the caller that indicates whether a reboot was required or not.

Parameters that may be passed to the function may include options to configure which components are shutdown and how they are shutdown such as forceful shutdown (If this option is specified then the reboot reduction infrastructure will attempt to shutdown an application or service without their cooperation) and shutdown applications only if all of them can be restarted (If this option is specified then the reboot reduction infrastructure will only shutdown processes and services if they have all registered for restart. Therefore, if any application or service cannot be restarted, then no application or service is shutdown), etc. Possible return values include all shutdown operations successfully completed, one or more applications or services require a reboot to be shutdown and no shutdown actions were performed, one or more application(s) could not be shutdown, etc. For all errors other than those described above, the API may return the most recent error received while running from any other component. For example, these may be standard errors from winerror.h.

Shutting Down Applications

Before the shutting apps, the reboot reduction infrastructure may use a function to get the command that will be used later to restart the application.

The following may be the steps performed by the reboot reduction infrastructure when shutting down applications:

Action Description

1. Applications and Services may be closed in an order that is least disruptive to the user. For example, it may order application shut downs based on how often the user interacts with an application, whether the user can interact with the application (for example, if the application displays a graphical user interface), background applications that are needed for frequently performed user operations (e.g. in the Windows operating this could be the Print Spooler service that is need to perform printing). It may restart application in the opposite order they were shutdown.

Applications and services may be closed using the same notifications sent when the computer is shutting down. This could allow applications the reboot reduction infrastructure to shutdown applications without requiring additional work in the application.

Applications and services may also be required to shutdown within a specified timeout, e.g. this could be 5 seconds. If the user of the no reboot infrastructure specified a force shutdown, applications and services may be forcefully closed if they do not shutdown within the timeout.

The reboot reduction infrastructure may store status of the shutdown request for each application or service.

Restart Applications Function

This function may restart applications that were previously shutdown.

Return values may include that one or more application(s) did not restart after the restart attempt, a failure reason code etc. For all errors other than those described above, the API returns the most recent error received while running from any other component. For example, these may be standard errors from winerror.h The reboot reduction infrastructure may follow the sequence when restarting apps and services that were previously shutdown. It may order restart of applications in way to reduce user disruption. For example, it may order application restarts based on how often the user interacts with an application, whether the user can interact with the application (for example, if the application displays a graphical user interface), background applications that are needed for frequently performed user operations (e.g. in the Windows operating this could be the Print Spooler service that is need to perform printing). It may restart applications in the opposite order they were shutdown.

Only applications shutdown by the reboot reduction infrastructure may be restarted. For example, if a user closes applications themselves then the reboot infrastructure may assume the user did not want the use the application and therefore may not restart the application after the software modification has applied.

The reboot reduction infrastructure may provide a way to cancel any operation requested by the caller (e.g. installers).

The reboot reduction infrastructure may allow installers, users or System Administrators to modify the timeout values that is uses during shutdown for any application or service.

A function may provide status information for the progress of the reboot reduction infrastructure function. This may be used by the component controlling the User Interface to show progress information. For example, this function could return a percentage complete value using the number of applications and services shutdown or restart. It may also return a text message describing the current operation. The function may change value after any application has been shutdown or restarted.

All the information returned to the caller may also be written to a central log. The information in the log file can be used by IT administrators or application developers to know which resources are frequently updated, how often a reboot was required, the reason for the reboot, which applications and services were shutdown, which applications and services failed to shutdown, which app/service successfully restarted, which apps/services registered a restart command line etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of minimizing disruptions by modifications to software applications or services comprising:
   communicating that a software modification to an application or service is necessary;
   detecting whether the application or service has a resource in use;
   if the application or service has the resource in use:
      having the application or service save state data and user data; and
      asking the application or service to release the resource using least intrusive approach possible selected from a group comprising:
         releasing the resource with a partial loss in functionality;
         shutting down the application or service; and
         shutting down computing system;
      identifying applications or services that are dependent on the application or service that is to be shutdown; and
      asking the identified applications or services to release the resource using least intrusive approach possible selected from a group comprising:
         releasing the resource with a partial loss in functionality;
         shutting down the identified applications or services; and
         shutting down computing system;
      installing the software modification; and
      if the application or service was shut down:
         restarting the application or service; and
         using the stored state data and user data to restore the application or service to the state the application or service was in before the restart;
   wherein if the application or service is logged in by multiple users, performing at least one of:
      obtaining permission from all users to allow the application or service to be shutdown so that the software modification can be installed;
      obtaining permission to shut down the application or service from a user with highest authority and informing other users that the application or service is going to be shutdown, if permission from the user with the highest authority is not obtained, delaying the software modification installation until the user with the highest authority stops using the application or service; and
      allowing users to switch to an additional application or service such that the software modification can be installed.

2. The method of claim 1, wherein the software modification comprises a maintenance operation.

3. The method of claim 1, further comprising identifying the applications or services that needs to be shutdown before the software modification begins.

4. The method of claim 1, further comprising if the application or service is an application or service visible to a user, advising the user that a shutdown is necessary and allowing the user to select to defer the shutdown until a time in future when the application or service is not active.

5. The method of claim 1, further comprising activating a monitoring system that watches the computing system and installing the software modification upon one of: log-off, on process termination or when the resource is released.

6. The method of claim 1, further comprising implementing a reboot reduction infrastructure that asks the applications or service to shutdown or release the resource or initiate a log-off when the software modification is applied.

7. The method of claim 6, further comprising providing periodic reminders of the application or service that need to be restarted such that the software modification may be installed.

8. The method of claim 1, further comprising when a reboot or log-off is necessary to install the software modification, asking the application or service to save state data without requiring user intervention and restarting the application or service using the state data to return the application or service to a similar state before the application or service was rebooted or a user logs on.

9. The method of claim 1, further comprising if the application or service has the resource in use but the application or service is not visible to a user:
   automatically shutting down the application or service;
   installing the software modification; and
   restarting the application or service without providing notice to the user.

10. The method of claim 1, further comprising asking the application or service to store state data and user data and using information provided by the application or service to initiate a restoration of the application or service to the state they were in before the restart.

11. A non-transitory computer storage medium with computer executable instructions for minimizing disruptions by modifications to software applications or service comprising computer executable code for:
   registering resources, applications and services with a reboot reduction infrastructure application;
   communicating that a software modification to an application or service is necessary;
   detecting whether the applications or service has a resource in use;
   if the application or service has the resource in use:
      having the application or service save state data;
      asking the application or service to release the resource using least intrusive approach possible selected from a group comprising:
         releasing the resource with a partial loss in functionality;
         shutting down the application or service; and
         shutting down computing system;
      identifying applications or services that are dependent on the applications or service that is to be shutdown; and
      asking the identified applications or services to release the resource using least intrusive approach possible selected from a group comprising:
         releasing the resource with a partial loss in functionality;
         shutting down the applications or services; and
         shutting down computing system;
      installing the software modification; and
      if the application or service was shut down:
         restarting the application or service; and
         using the stored state data to restore the application or service to the state the application or the service was in before the restart;

wherein if the application or service is logged in by multiple users, performing at least one of:
- obtaining permission from all users to allow the application or service to be shutdown so that the software modification can be installed;
- obtaining permission to shut down the application or service from a user with highest authority and informing other users that the application or service is going to be shutdown, if permission from the user with the highest authority is not obtained, delaying the software modification installation until the user with the highest authority stops using the application or service; and
- allowing users to switch to an additional application or service such that the software modification can be installed.

12. The non-transitory computer storage medium of claim 11, further comprising computer executable code for advising a user that a application or service shutdown is necessary and allowing the user to select to defer the shutdown until a time in future when the application or service is not active if the application or service is an application or service visible to the user.

13. The non-transitory computer storage medium of claim 11, further comprising computer executable code for installing the software modification upon one of: log-off, on process termination or on when the resource is released.

14. The non-transitory computer storage medium of claim 11, further comprising computer executable code that when a reboot or log-off is necessary to install the software modification, asks the applications or service to save state data without requiring user intervention and restarts the applications or service using the state data to return the application or service to a similar state before the application or service was rebooted or a user logs on.

15. The non-transitory computer storage medium of claim 11, further comprising computer executable code that if the application or service has the resource in use but the application or service is not visible to a user:
- automatically shuts down the application or service;
- installs the software modification; and
- restarts the application or service without providing notice to the user.

16. A computer system comprising a processor for executing computer executable code, a memory for storing computer executable code and an input/output device, the computer executable code comprising code for:
- registering resources, applications and services with a reboot reduction infrastructure application;
- communicating that a software modification to an application or service is necessary;
- detecting whether the application or service has a resource in use;
- if the application or service has the resource in use:
  - having the application or service save state data;
  - asking the application or service to release the resource using least intrusive approach possible selected from a group comprising:
    - releasing the resource with a partial loss in functionality;
    - shutting down the application or service; and
    - shutting down computing system;
  - identifying applications or services that are dependent on the application or service that is to be shutdown; and
  - asking the identified applications or services to release the resource using least intrusive approach possible selected from a group comprising:
    - releasing the resource with a partial loss in functionality;
    - shutting down the applications or services; and
    - shutting down computing system;
- installing the software modification; and
- if the application or service was shut down:
- restarting the application or service; and
- using the stored state data to restore the application or service to the state the application or the service was in before the restart;
wherein if the application or service is logged in by multiple users, performing at
least one of:
- obtaining permission from all users to allow the application or service to be shutdown so that the software modification can be installed;
- obtaining permission to shut down the application or service from a user with highest authority and informing other users that the application or service is going to be shutdown, if permission from the user with the highest authority is not obtained, delaying the software modification installation until the user with the highest authority stops using the application or service; and
- allowing users to switch to an additional application or service such that the software modification can be installed.

17. The computer system of claim 16 further comprising computer executable code that if the application or service is not visible, proceeding without user intervention to:
- shut down the application or service;
- install the software modification; and
- restart the application or service without providing notice to a user if the application or service has the resource in use but the application or service is not visible to the user.

* * * * *